(12) United States Patent
Frey

(10) Patent No.: US 9,037,122 B2
(45) Date of Patent: May 19, 2015

(54) FIXED LINE EXTENSION FOR MOBILE TELEPHONES

(75) Inventor: Alan E. Frey, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/408,700

(22) Filed: Feb. 29, 2012

(65) Prior Publication Data

US 2013/0225142 A1 Aug. 29, 2013

(51) Int. Cl.
H04M 3/42 (2006.01)
H04W 4/16 (2009.01)
H04M 3/00 (2006.01)
H04W 4/02 (2009.01)

(52) U.S. Cl.
CPC .............. H04W 4/16 (2013.01); *H04W 4/021* (2013.01); H04M 3/00 (2013.01)

(58) Field of Classification Search
CPC .......... H04M 3/00; H04W 4/021; H04W 4/16
USPC ............. 455/417, 413, 445, 435.1, 456.2, 77, 455/556.1, 418, 550.1, 411, 267; 370/452, 370/483, 248, 470; 709/251, 238, 224
See application file for complete search history.

(56) References Cited

U.S. PATENT DOCUMENTS

| 4,709,365 | A | 11/1987 | Beale et al. |
| 5,627,842 | A | 5/1997 | Brown et al. |
| 6,463,472 | B1 | 10/2002 | Van Loo |
| 6,704,796 | B1 * | 3/2004 | Cosgriff et al. ............... 709/238 |
| 7,302,255 | B1 * | 11/2007 | Lundy et al. ............... 455/414.1 |
| 7,526,296 | B1 * | 4/2009 | Lundy et al. .................. 455/461 |
| 2003/0196076 | A1 | 10/2003 | Zabarski et al. |
| 2003/0204636 | A1 | 10/2003 | Greenblat et al. |
| 2003/0212830 | A1 | 11/2003 | Greenblat et al. |
| 2005/0021713 | A1 | 1/2005 | Dugan et al. |
| 2005/0117726 | A1 | 6/2005 | DeMent et al. |
| 2007/0140150 | A1 | 6/2007 | Beck et al. |
| 2007/0153999 | A1 * | 7/2007 | Daigle ..................... 379/142.07 |
| 2007/0154004 | A1 * | 7/2007 | Daigle ..................... 379/211.04 |
| 2007/0154005 | A1 * | 7/2007 | Daigle ..................... 379/211.04 |
| 2007/0281703 | A1 * | 12/2007 | Shkedi .......................... 455/445 |
| 2008/0096553 | A1 | 4/2008 | Saksena et al. |
| 2010/0054441 | A1 * | 3/2010 | Daigle ..................... 379/207.02 |
| 2011/0177797 | A1 * | 7/2011 | Vendrow et al. ........... 455/414.1 |
| 2011/0305238 | A1 * | 12/2011 | Ikuta et al. .................... 370/352 |

OTHER PUBLICATIONS

"SIP Message Flows", Alcatel-Lucent, Mar. 2010, 7 pp.

* cited by examiner

*Primary Examiner* — Joseph Arevalo

(74) *Attorney, Agent, or Firm* — Fay Sharpe LLP

(57) ABSTRACT

A method of dynamically invoking a simultaneous ring feature in a telecommunications network includes: identifying a call directed to user equipment (20); notifying the user equipment (20) of the identified call; and, receiving an indication from the user equipment (20) whether or not the simultaneous ring feature should be invoked base on a determined location of the user equipment (20).

20 Claims, 3 Drawing Sheets

FIXED LINE EXTENSION FOR MOBILE TELEPHONES

BACKGROUND

The present inventive subject matter relates generally to the art of telecommunications. Particular but not exclusive relevance is found in connection with mobile telephones, and accordingly the present specification makes specific reference thereto. It is to be appreciated however that aspects of the present inventive subject matter are also equally amenable to other like applications.

When people are at certain locations or in certain places, they may be more likely to miss a call to their mobile telephone or other like mobile user equipment (UE), as opposed to when they are when they are out and about. For example, when a person is at their home (or other frequented location), he may set his mobile telephone down and/or otherwise leave it in one place or room rather than carry it with him as he moves around the house or location; as a result, he may not hear the mobile telephone ring if he happens to be too far away from it when someone calls the mobile telephone. On the other hand, a home or other location or building may be provisioned with one or more landline or other similarly fixed line telephones (e.g., corded and/or cordless telephones) that are commonly spread throughout the home or building in such a way that a person in the home can hear at least one of the landline telephones ring no matter where in the home or building that person may be.

To solve the aforementioned problem, a conventional simultaneous ring service may be used to ring an individual's home telephone in addition to their mobile telephone when a call is directed to the mobile telephone. However, conventional simultaneous ring services may have certain limitations and/or drawbacks. For example, conventional simultaneous ring services generally do not know when a user is at a given location, such as their home. In this case, the designated fixed line or landline telephone number is generally rung each time a call is placed to the user's mobile telephone regardless of whether or not the user is actually at the given location. This can be undesirable for any number of reasons. For example, ringing the fixed line or landline telephone may disrupt individuals at the given location, even though the call is intended for the mobile telephone user who is not there. Moreover, when the mobile telephone user is away from the given location, if the call is answered on the simultaneously ringing fixed line or landline telephone by another individual at the location before it can be or is answer by the user via the mobile telephone, then the call may not reach the mobile telephone user for which the call was intended.

Accordingly, a new and/or improved method, apparatus, mobile application and/or system is disclosed which addresses the above-referenced problem(s) and/or others.

SUMMARY

This summary is provided to introduce concepts related to the present inventive subject matter. The summary is not intended to identify essential features of the claimed subject matter nor is it intended for use in determining or limiting the scope of the claimed subject matter. The embodiments described below are not intended to be exhaustive or to limit the invention to the precise forms disclosed in the following detailed description. Rather, the embodiments are chosen and described so that others skilled in the art may appreciate and understand the principles and practices of the present inventive subject matter.

In accordance with one embodiment, a method is provided for dynamically invoking a simultaneous ring feature in a telecommunications network. The method includes: identifying a call directed to user equipment; notifying the user equipment of the identified call; and, receiving an indication from the user equipment whether or not the simultaneous ring feature should be invoked base on a determined location of the user equipment.

In accordance with another embodiment, a method is provided for dynamically invoking a simultaneous ring feature in a telecommunications network. The method includes: sending a first request from a mobile telephone to a node of the telecommunications network, the first request requesting that the mobile telephone be notified if a call is directed to the mobile telephone; receiving at the mobile telephone a notification when a call is directed to the mobile telephone; determining a location of the mobile telephone; and, sending a second request from the mobile telephone based on the determined location of the mobile telephone, the second request requesting that the simultaneous ring feature be invoked.

Numerous advantages and benefits of the inventive subject matter disclosed herein will become apparent to those of ordinary skill in the art upon reading and understanding the present specification. It is to be understood, however, that the detailed description of the various embodiments and specific examples, while indicating preferred and other embodiments, are given by way of illustration and not limitation. Many changes and modifications within the scope of the present invention may be made without departing from the spirit thereof, and the invention includes all such modifications.

BRIEF DESCRIPTION OF THE DRAWING(S)

The following detailed description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION OF THE EMBODIMENT(S)

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the embodiment(s) presented herein. Moreover, the apparatuses and methods disclosed in the present specification are described in detail by way of examples and with reference to the figures. Unless otherwise specified, like numbers in the figures indicate references to the same, similar or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific materials, techniques, arrangements, etc. are either related to a specific example presented or are merely a general description of such a material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the figures.

Figure 1:
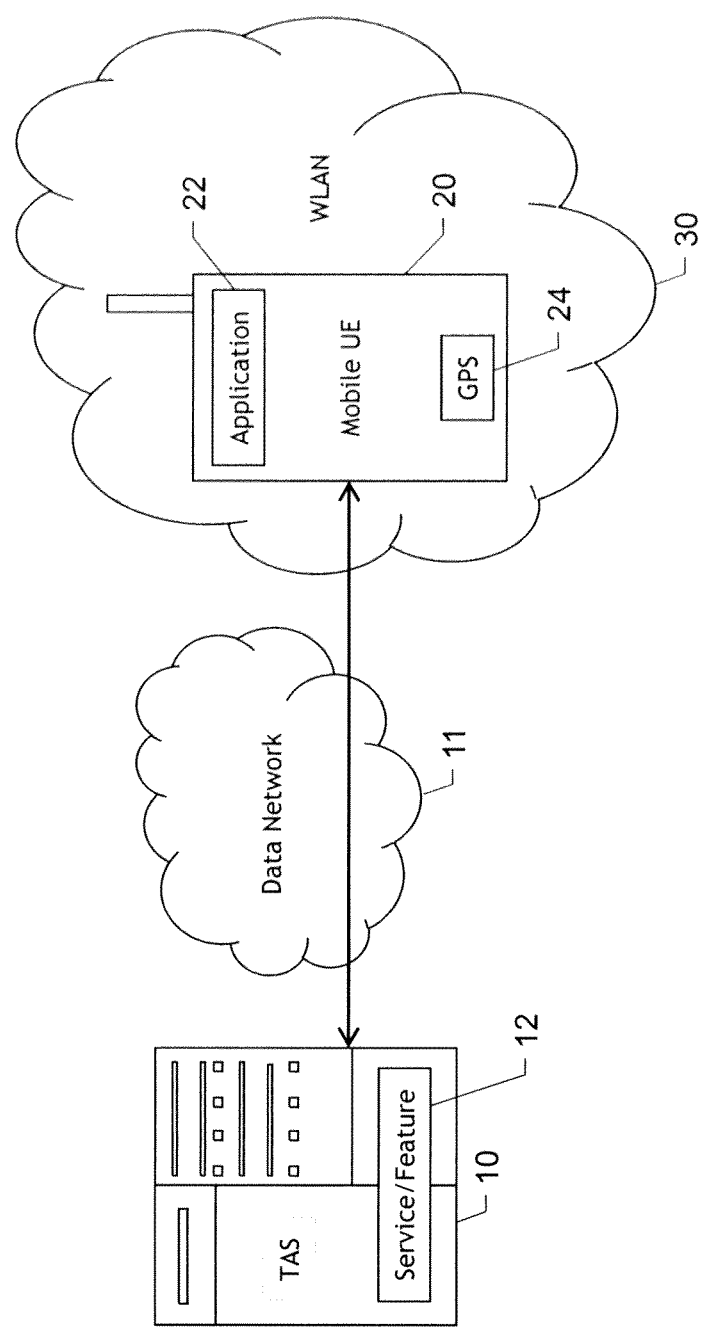
FIG. 1 is a diagrammatic illustration showing a telephony application server and mobile user equipment suitable for practicing aspect of the present inventive subject matter.

With reference now to FIG. 1, in general, the present specification relates in part to a telephony feature and/or service (e.g., implemented via a server side application indicated by reference numeral 12 running on a telephony application server 10) which permits a user and/or subscriber to selectively employ one or more fixed lines or landline telephones as an extension of their mobile telephone or other like mobile user equipment (UE) 20. In practice, an application (indicated by reference numeral 22) for utilizing and/or configuring the aforementioned feature or service 12 may be downloaded and/or otherwise installed on the user's mobile UE 20. As shown, the telephony application server (TAS) 10 and mobile UE 20 (and/or the service 12 and the application 22) may communicate via a suitable data network 11.

Suitably, the user may selectively configure the application 22 so that when a call is placed and/or directed to his UE 20, in addition to the UE 20, a designated fixed line or landline telephone may also be simultaneously called and/or rung, if and/or when the user's UE 20 is determined to be at a given location or within a given region, e.g., which coincides with or overlaps or is otherwise sufficiently proximate the location of the designated fixed line or landline telephone. In practice, the application 22 may selectively send, post or otherwise provide a subscription or request to the TAS 10 administering and/or providing the service 12, to be notified thereby whenever the UE 20 is called.

Accordingly, when a call is placed and/or directed to the UE 20, before the call is set up with or completed to the UE 20, the TAS 10 in response to the subscription or request notifies the application 22 on the UE 20 of the impending call. Suitably, completion and/or setting up of the call with the UE 20 is optionally suspended or delayed until the application 22 responds to the notification or until sufficient time for the application 22 to response has elapsed. Generally, in response to the notification, the application 22 determines whether or not one or more designated fixed lines or landline telephones should be simultaneously called and/or rung based on one or more criteria, e.g., such as the determined location of the UE 20, the time of day, the date, the day of the week or other temporal parameters, the identity of the calling party, etc. Optionally, the location of the UE 20 may be determined using coordinates and/or other suitable data or information obtained and/or derived from a Global Positioning System (GPS) receiver 24 with which the UE 20 is equipped or via other suitable position determining equipment and/or methods.

In one suitable embodiment, the location of the UE 20 is determined and/or resolved by detecting and/or monitoring a connection status of the UE 20 with a wireless local area network (WLAN), e.g., such as a Wi-Fi network or other Institute of Electrical and Electronics Engineers (IEEE) 802.11 network. For example, if it is detected that the UE 20 is connected to a given WLAN such as the WLAN 30 depicted in FIG. 1, then the UE 20 may be presumed or deemed or otherwise determined to be in a given location or within a given region, i.e., within the effective range or coverage area of the WLAN to which the UE 20 is connected. In practice, the WLAN may be identified by its Service Set Identification (SSID) or other suitable network identifier.

Optionally, the application 22 may be configured such that when the UE 20 connects to a WLAN having a designated SSID or other identifier, the application 22 sends, posts or otherwise provides a subscription or request to the TAS 10 to be notified thereby if and/or when a call is placed to the UE 20. Accordingly, when such a call is placed, the TAS 10 in response to the subscription provides the requested notification to the application 22 on the UE 20. In this way, when the UE 20 is connected to the WLAN (and hence within the region or location defined by the WLAN's effective range or coverage area), the application 22 is notified of calls placed to the UE 20. Accordingly, in response to the notification, the application 22 may selectively instruct the TAS 10 (optionally depending on other criteria as well) of the desire to have implemented a simultaneously calling and/or ringing of one or more fixed lines or landline telephones, e.g., whose locations are coincident with and/or proximate the location or coverage area of the WLAN.

Figure 2:
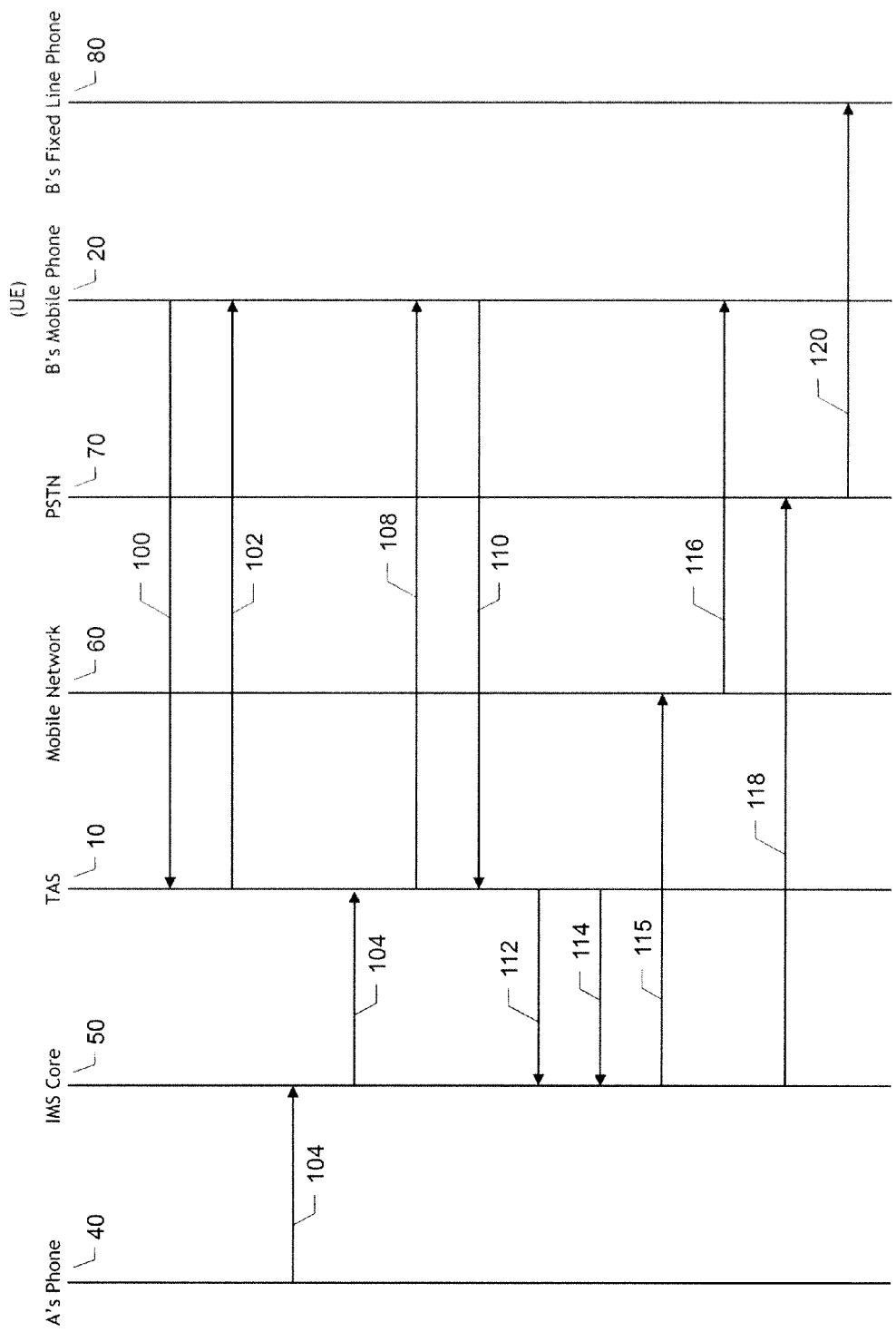
FIG. 2 is a post and rail diagram illustrating a partial call flow suitable for practicing aspects of the present inventive subject matter.
Figure 3:
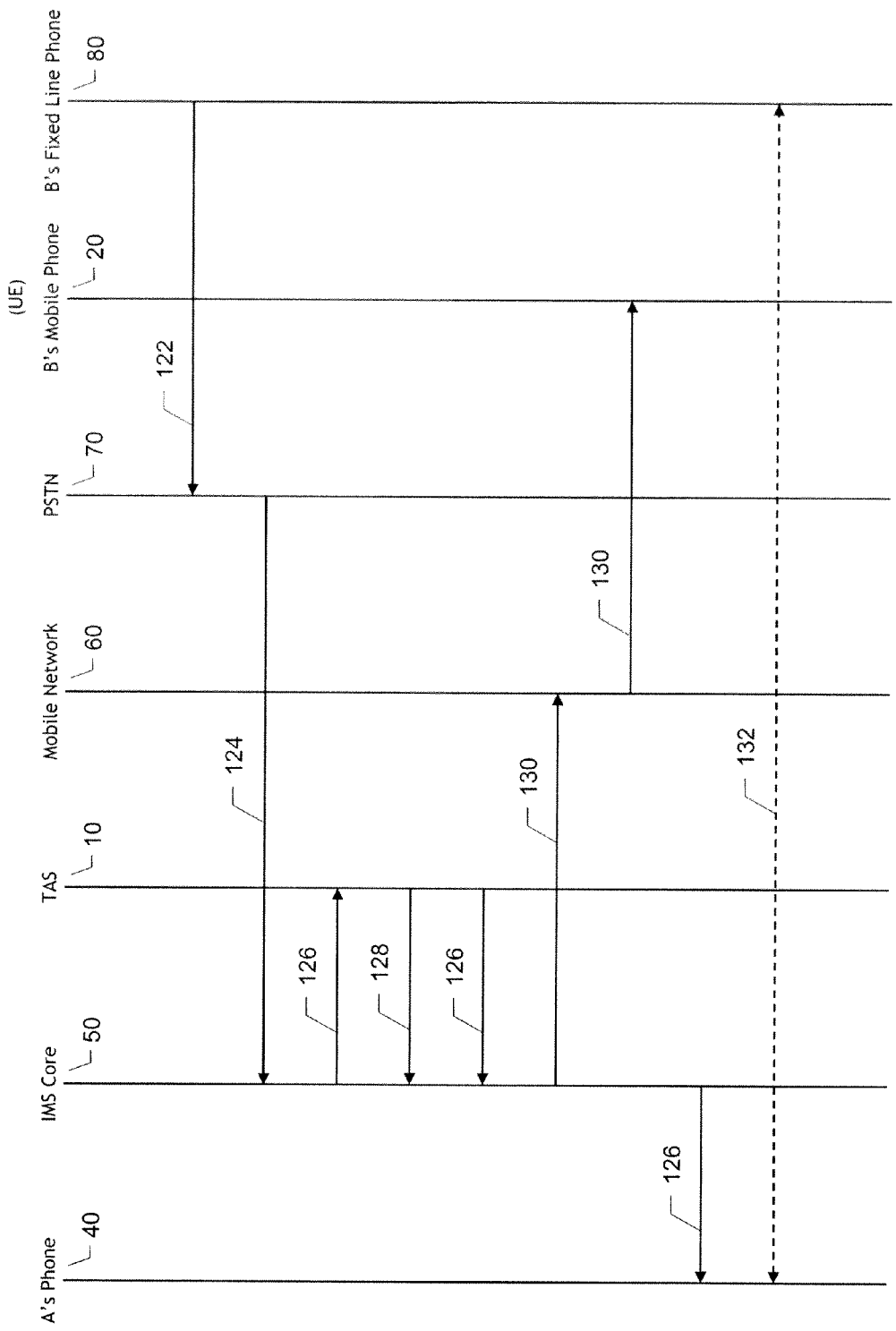
FIG. 3 is a post and rail diagram illustrating a continuation of the call flow from FIG. 2, where the top of FIG. 3 continues from the bottom of FIG. 2.

With reference to FIGS. 2 and 3, there is illustrated an exemplary call flow suitable for practicing aspects of the present inventive subject matter. As shown, a number of network entities and/or network nodes or components participate in the illustrated call flow, including: a calling party A that uses their telephone 40 or the like to place a call to the mobile telephone or UE 20 of a party B; an Internet Protocol (IP) Multimedia Subsystem (IMS) or IMS Core 50; the TAS 10; a mobile network 60; a Public Switched Telephone Network (PSTN) 70; and party B's fixed or landline telephone 80. In the illustrated call flow, various messages and/or signaling are exchanged between the aforementioned network entities, nodes, etc. Suitably, each network entity, node, etc. is therefore in the usual manner operatively connected to and/or otherwise in communication with the other network entities, nodes, etc. to which messages and/or signals are sent and/or from which messages and/or signals are received. While certain network entities, nodes, etc. are shown in the illustrated call flow, it is to be appreciated that as appropriate and/or in other various alternate embodiments, other intervening and/or otherwise arranged network entities, nodes, etc. (which are not shown) may be utilized in practice in the usual manner to route, translate and/or otherwise facilitate the transmission of the various messages and/or signals.

For the purpose of this exemplary call flow, it is assumed that party B has signed up for, registered and/or otherwise has active for their mobile UE 20 the feature or service 12 administered by the TAS 10, and have downloaded or otherwise had installed the application 22 on their UE 20. Suitably, party B has also configured the application 22 so that calls to his mobile UE 20 will also ring his fixed line or landline telephone 80 (e.g., his home telephone) when he is at the location of the fixed lined or landline telephone 80 (e.g., when he is at home); or more precisely, when party B's UE 20 is connected to a WLAN at that location, as identified by the SSID name set up for the WLAN. As a result, when the UE 20 connects to this WLAN (i.e., the one have the designated SSID), the application 22 running on the UE 20 subscribes or requests to be notified when the telephone number of the UE 20 is called.

Suitably, the application 22 may consult or access a profile or table or database (DB) to determine if and/or when, e.g., to post a subscription and/or send a notification request to the TAS 10. Each profile may have one or more associated fields and the user (or party B in this example) may selectively enter values in each of the fields. For example, each profile may include a field for: the name of a given location (e.g., "home"); the SSID or other identifier of a WLAN at that location; the address or telephone or directory number (DN) of a fixed line or landline telephone at that location; and optionally, desired temporal restrictions. In one suitable embodiment, a plurality of such profiles may be included in a table or DB or the like, with each profile corresponding to a different location. For example, one profile may be defined for a user's primary home, another for a user's vacation home, another for a user's place of work, etc.

Accordingly, when the UE 20, which is running the application 22, connects to a WLAN, the application 22 accesses and/or consults the table or DB to find or look for a profile containing an SSID or other network identifier value that matches the SSID or other network identifier of the WLAN to which the UE 20 is connecting. If such a profile is located, then the UE 20 (and hence its user or party B in this case) is deemed to be at the location identified in the associated field of the located profile.

Assuming the foregoing match is found, the application 22 running on the UE 20 posts a subscription or otherwise sends a notification request 100 to the TAS 10, requesting notification when the address or DN of the UE 20 is called. Suitably, the subscription or notification request message 100 may take the form of a Hypertext Transfer Protocol (HTTP) POST that identifies the UE 20, e.g., via its address and/or DN, and requests notification when a call is directed thereto. In response, the TAS 10 optionally returns confirmation 102 of the subscription or request, e.g., via an HTTP 201 CREATED message or the like.

At some time later (but while the subscription or notification request is still in effect and/or active), party A calls party B's mobile UE 20, e.g., by dialing the same on party A's telephone 40. Accordingly, a suitable message or signal 104 is directed to the IMS Core 50. For example, the message or signal 104 may be a Session Initiation Protocol (SIP) INVITE message or the like which indicates the DN or address being called, i.e., the DN or address of the UE 20 in this case. In turn, the message or signal 104 is forwarded to the TAS 10.

Upon receiving the forwarded massage or signal 104, the TAS 10 notes the address or DN being called, and since the application 22 running on the UE 20 has subscribed and/or requested to be notified about calls to the UE 20, instead of immediately setting up the call to the UE 20, the TAS 10 first sends a notification 108 to the UE 20 and waits for a response therefrom indicating how the call should be handled. For example, the notification 108 may take the form of an HTTP POST that indicates a call is being directed to the address or DN of the UE 20, and it may also indicate the identity (i.e., address and/or DN) of the calling party, in this case party A.

In response to receiving the notification 108, the application 22 running on the UE 20 now determines if a simultaneous ring is to be performed based on one or more criteria. Optionally, since the subscription was still active, it may be assumed that the UE 20 is still connected to the WLAN and hence the UE 20 (and its user or party B in this case) is still at the location identified in the associated field of the previously located profile containing the matching SSID or other network identifier. That is to say, optionally, upon the UE 20 disconnecting from the WLAN, the UE 20 and/or the application 22 running thereon may cancel the previously posted subscription or notification request with the TAS 10. Accordingly, in that case, the TAS 10 upon receiving the forwarded call set up request or message 104 would not suspend otherwise normal call processing and would not send the notification 108 to the UE 20 (since no active or current subscription or notification request would be registered with the TAS 10), but would instead allow the call to be set up normally and/or otherwise process the call in the usual manner. Optionally, in response to the notification 108, the application 22 may confirm or again determine the location of the UE 20, e.g., by noting the connection status of the UE 20 to a WLAN and accessing the aforementioned profiles as previously described.

Suitably, the application 22 may also consider other criteria to determine whether or not to request performing a simultaneous ring. For example, depending on the calling party identified in the notification 108, the application 22 may choose whether or not to request performance of a simultaneous ring. Optionally, the application 22 may again access and/or consult the active or current profile (i.e., the profile for the current location) to obtain any temporal restriction which may apply to determine whether or not to request performance of a simultaneous ring.

Suitably, if the application 22 determines that simultaneous ring is not to be performed, then a response to the notification 108 may simply be returned to the TAS 10 and in turn the TAS 10 would allow the call to be set up normally and/or otherwise process the call in the usual manner.

However, as shown in FIGS. 2 and 3, it is assumed that the application 22 has determined that simultaneous ring should be requested. Accordingly, in response to the notification 108, a signal or message 110 requesting the same is returned to the TAS 10. For example, the signal or message 110 may take the form of an HTTP 200 OK message including and/or accompanied by a request to perform or invoke simultaneous ringing. Suitably, the message or signal 110 also identifies the fixed line or landline telephone which is to be simultaneously called or rung (in this case party B's fixed or landline telephone 80). For example, to identify the fixed line or landline telephone which is to be simultaneously called or rung, the application 22 may obtain and forward the DN or address thereof which is designated in the active or current profile.

Accordingly, since the application 22 has requested and/or invoked simultaneous ringing via the message or signal 110, the TAS 10 will in response set up or initiate set up of a call leg directed to the UE 20 (e.g., which is the otherwise normal operation for the call) and also simultaneously (or substantially simultaneously) set up or initiate set up of a call leg or fork directed to the address or DN identified in the signal or message 110, i.e., party B's fixed or landline telephone 80 in this case. More specifically, as shown in FIGS. 2 and 3, corresponding call set up requests or messages 112 and 114 are directed to the IMS Corce 50. For example, call set up or request messages may be SIP INVITEs indicating the respective addresses and/or DNs to which the calls or call legs are being directed.

Consequently, the IMS Core 50 (in response to the call set up request 112 for the UE 20) routes the call set up or request message 115 to the mobile network 60, which in turn participates in a call set up exchange 116 with the UE 20. In this manner, the UE 20 is rung or otherwise alerted by the incoming call. For the other call leg or fork (i.e., to the fixed line or landline telephone 80), the IMS Core 50 sends a message 118 and/or otherwise signals the PSTN 70 (in response to the call set up request message 114 for the fixed or landline telephone 80), which in turn powers or otherwise provides a signal 120 to ring or otherwise alert the fixed line or landline telephone 80. Suitably, the message 118 may take the form of an Integrated Services Digital Network (ISDN) User Part (ISUP) Initial Address Message (IAM), e.g., which includes the address and/or DN to which the call or call leg is being directed, in this case the address or DN of the fixed line or landline telephone 80. Accordingly, both the UE 20 and fixed line or landline telephone 80 are made to ring or otherwise alert.

For the purpose of this example, the call flow follows the case where the fixed line or landline telephone 80 is answered first. However, it is to be appreciated that in practice the UE 20 may be answered first. In that case, a similar call flow may result, however, the call leg and/or call set up to the UE 20 would be completed, while the call leg or fork to the fixed line or landline telephone 80 would be released or dropped or otherwise cancelled.

As shown, when the fixed line or landline telephone 80 is answered, an off-hook or other like signal 122 is returned to the PSTN 70, which in turn sends a message 124 or otherwise signals the IMS Core 50 that the call has been answered. In response, the IMS Core 50 sends a message 126 to or otherwise signals the TAS 10, indicating that the call has been answered. For example, the message 126 may take the form of an HTTP 200 OK message responsive to the call set up or request message 114. Once the TAS 10 is informed that one of the call legs set up for the call has been answered (in this case the call leg set up to the fixed line or landline telephone 80), it drops the other call leg set up for the call (in this case the call leg to the UE 20). It also sends back the appropriate signaling and/or message(s) to the calling party to set up the connection, in this case between party A's telephone 40 and party B's fixed line or landline telephone 80.

More specifically, as shown in the illustrated call flow, the message 126 may simply be forwarded and/or otherwise routed back from the TAS 10 through the IMS Core 50 to party A's telephone 40. In this way, the connection 132 is established and/or otherwise completed between the telephone 40 and the fixed line or landline telephone 80. Moreover, as shown in the illustrated call flow, to cancel the call leg to the UE 20, the TAS 10 may send a cancel message 128 or other like message or signal to the IMS Core 50, which would in turn send or forward or otherwise route a release message 130 or other like message or signal to the UE 20, e.g., through the mobile network 60. Accordingly, the UE 20 would cease ringing and/or otherwise alerting.

As the example call flow demonstrates, a simultaneous ring feature is selectively invoked dynamically at the time of a particular call to a user's mobile UE in response to various criteria, including a detected or otherwise determined location of the called party or user, or more specifically, the detected or otherwise determined location of the user's mobile UE. In practice, the call set up and/or completion to the UE may be temporarily suspended or delayed, while it is determined whether or not the simultaneous ring feature should be invoked. Suitably, the location of the UE (and hence the presumed location of its user) may be determined by monitoring the connection status of the UE to a WLAN. Of course, other data, information and/or methods may be used to detect and/or otherwise determine the location of the UE, e.g., such as data and/or information obtained and/or derived from a GPS receiver with which the UE is equipped.

The above methods, apparatus and/or systems have been described with respect to particular embodiments. It is to be appreciated, however, that certain modifications and/or alteration are also contemplated.

It is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, methods, functions, elements and/or components described herein may suitably be implemented via hardware, software, firmware or a combination thereof. In particular, the TAS 10 and/or mobile UE 20 may include a processor, e.g., embodied by a computer or other electronic data processing device, that is configured and/or otherwise provisioned to perform one or more of the tasks, steps, processes, methods and/or functions described herein. For example, a computer or other electronic data processing device employed in the TAS 10 and/or the mobile UE 20 may be provided, supplied and/or programmed with a suitable listing of code (e.g., such as source code, interpretive code, object code, directly executable code, and so forth) or other like instructions or software or firmware (e.g., such as the application 22 or an application to administer the service or feature 12), such that when run and/or executed by the computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred and/or other embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of dynamically invoking a simultaneous ring feature in a telecommunications network, said method comprising:
   identifying a call directed to a subscriber device associated with a subscriber to a simultaneous ring feature;
   notifying the subscriber device of the identified call, at least one of the subscriber and subscriber device having previously arranged to have notifications sent to the subscriber device after calls directed to the subscriber device are identified in conjunction with the simultaneous ring feature;
   receiving an indication from the subscriber device in response to the notification of the identified call, wherein the indication selectively invokes the simultaneous ring feature based on a determined location of the subscriber device in conjunction with processing the call;
   setting up a first call leg to the subscriber device; and
   if the simultaneous ring feature is invoked, setting up a second call leg to an address associated with the subscriber different than that of the subscriber equipment;
   wherein the address is associated with a fixed line end user device in a location related to the determined location of the subscriber device.

2. The method of claim 1, said method further comprising:
   obtaining a request from at least one of the subscriber and the subscriber device requesting notifications be sent to the subscriber device after a call directed thereto is identified.

3. The method of claim 2, wherein the request is obtained after the subscriber device connects to a local area network.

4. The method of claim 1, said method further comprising:
   at least temporarily suspending setting up the call to the subscriber device to provide time for notifying the subscriber device of the identified call and receiving the indication from the subscriber device.

5. The method of claim 1, wherein the second call leg is not set up if the received indication from the subscriber device does not invoke the simultaneous ring feature.

6. The method of claim 1, wherein the address for the second call leg is obtained along with the received indication from the subscriber device.

7. The method of claim 1, wherein the fixed line end user device is a telephone.

8. The method of claim 1, wherein the address is a telephone number.

9. The method of claim 1, wherein the subscriber device is a mobile telephone.

10. A telephony application server provisioned to execute the method of claim 1.

11. A method of dynamically invoking a simultaneous ring feature in a telecommunications network, said method comprising:
   sending a request from a mobile telephone to a network node of a telecommunications network requesting that the mobile telephone be notified if a call directed to the mobile telephone is identified by the network node, wherein the mobile telephone is associated with a subscriber to a simultaneous ring feature, wherein the request is associated with the simultaneous ring feature;
   receiving a notification at the mobile telephone via the telecommunications network that a call directed to the mobile telephone was identified;
   determining a location of the mobile telephone; and,
   sending an indication from the mobile telephone to the network node in response to the received notification selectively invoking the simultaneous ring feature in conjunction with processing the call, wherein the mobile telephone selectively invokes the simultaneous ring feature based at least in part on the determined location of the mobile telephone;
   wherein, in response to receiving the indication from the mobile telephone, the network node sets up a first call leg to the mobile telephone and, in response to the received indication invoking the simultaneous ring feature, the network node sets up a second call lea to a telephone number associated with the subscriber different than that of the mobile telephone;
   wherein the telephone number is associated with a fixed line end user device in a location related to the determined location of the mobile telephone.

12. The method of claim 11, wherein the mobile telephone selectively invokes the simultaneous ring feature based at least in part on at least one of a temporal restriction and an identity of a calling party.

13. The method of claim 11, wherein the network node is a telephony application server.

14. The method of claim 11, wherein the location of the mobile telephone is determined based on a connection status of the mobile telephone with a local area network.

15. The method of claim 11, wherein the indication identifies an address associated with the subscriber other than that of the mobile telephone to which the call should be directed along with the mobile telephone in conjunction with invoking the simultaneous ring feature.

16. A mobile telephone provisioned to execute the method of claim 11.

17. The method of claim 11, wherein the network node sets up the second call leg to fixed line end user device, wherein the fixed line end user device having been designated by the subscriber or mobile telephone to receive the call along with the subscriber device specifying the telephone number associated with the fixed line end user device in conjunction with invoking the simultaneous ring feature.

18. The method of claim 11, wherein the second call leg is not set up if the received indication from the mobile telephone does not invoke the simultaneous ring feature.

19. The method of claim 11, further comprising:
   sending the telephone number for the second call leg from the mobile telephone to the network node along with the indication invoking the simultaneous ring feature.

20. The method of claim 11, wherein the fixed line end user device is a telephone.

* * * * *